United States Patent [19]

Piskoti

[11] 3,905,823

[45] Sept. 16, 1975

[54] MOLD RELEASE COMPOSITION

[75] Inventor: Charles Piskoti, Adrian, Mich.

[73] Assignee: SWS Silicones Corporation, Adrian, Mich.

[22] Filed: Mar. 29, 1974

[21] Appl. No.: 456,561

Related U.S. Application Data

[63] Continuation-in-part of Ser. No. 298,159, Oct. 16, 1972.

[52] U.S. Cl. ......... 106/38.22; 106/287 SB; 117/139; 252/28
[51] Int. Cl. .............................................. B28b 7/36
[58] Field of Search .................. 106/38.22, 287 SB; 117/5.1, 139; 252/28; 260/448.2 R

[56] References Cited

UNITED STATES PATENTS

| | | | |
|---|---|---|---|
| 3,344,066 | 9/1967 | Schiefer et al. | 252/28 |
| 3,532,624 | 10/1970 | Cekada | 252/28 |
| 3,634,285 | 1/1972 | Brooks | 106/38.22 |
| 3,713,851 | 1/1973 | Cekada | 106/38.22 |

*Primary Examiner*—Lorenzo B. Hayes

[57] ABSTRACT

A mold release composition comprising an aminofunctional silicon fluid, an organopolysiloxane fluid, a polyglycol and a filler. The composition is useful as a mold release agent, especially in manufacturing of tires.

12 Claims, No Drawings

MOLD RELEASE COMPOSITION

This application is a continuation-in-part of application Ser. No. 298,159, filed on Oct. 16, 1972.

The invention relates to a mold release composition, particularly a mold release composition containing aminofunctional silicon fluids, and more particularly to a composition containing aminofunctional silicon fluids, an organopolysiloxane fluid, a polyglycol and a filler.

Heretofore, dimethylpolysiloxane fluids have been used as mold release agents in molding plastics and other materials. Generally it is applied to the mold surface prior to the introduction of the plastic or other material to be molded or shaped. Also dimethylpolysiloxane fluids have been used as release agents in manufacturing rubber tires. Generally the fluids are applied to the inside of the green carcass and a rubber bag is inflated therein to force the tire to assume the shape of the mold. Subsequently, the bag must release from the inside of the vulcanized tire without forming defects. One of the problems encountered in manufacturing tires is the short bag life. Another problem is that the bag overlaps or adheres to the inside of the carcass and causes defects therein.

Therefore, it is an object of this invention to provide a composition which will increase the bag life. Another object of this invention is to provide a composition having improved release properties. Still another object of this invention is to provide a composition which will give greater release efficieny. A further object of this invention is to provide a composition which has improved stability over a prolonged period of time.

The foregoing objects and others which will become apparent from the following description are accomplished in accordance with this invention, generally speaking, by providing a composition comprising (A) from 1 to 25 percent by weight of an organopolysiloxane fluid having an average viscosity of from 1,000 to about 600,000 cs. at 25°C; (B) from 0.1 to 10 percent by weight of an aminofunctional silicon fluid having a viscosity of from 10 to 500 cs. at 25°C; (C) from 20 to 70 percent by weight of mica having a particle size of from 60 to 600 mesh; (D) from 0.1 to 5.0 percent by weight of a thickening agent; (E) from 2 to 25 percent by weight of a polyglycol; (F) from 20 to 60 percent by weight of a hydrocarbon solvent having a boiling point below about 200°C. and if desired (G) from 0.1 to about 5.0 percent by weight of a wetting agent for the thickening agent.

Organopolysiloxane fluids used in this invention may be represented by the general formula

wherein the R(s), which may be the same or different represent monovalent hydrocarbon radicals or halogenated monovalent hydrocarbon radicals having from 1 to 18 carbon atoms and $n$ is a number greater than 20.

Radicals represented by R above are alkyl radicals, e.g., methyl, ethyl, propyl, butyl, octyl, dodecyl, and octadecyl; arylradicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, α-phenylethyl, β-phenylethyl and α-phenylbutyl; and the halo substituted radicals enumerated above.

The organopolysiloxane may be any linear or branched chained compound having an average of from 1.75 to 2.25 organic radicals per silicon atom. Generally it is preferred that the organopolysiloxane be free of terminal-hydroxyl groups; however, a small number of terminal-hydroxyl groups will not materially affect the release properties of the composition. The organopolysiloxane may have a minor amount of molecules having only one hydroxyl group or there may be a small number of molecules carrying an excess of two hydroxyl groups; however, as mentioned previously, it is preferred that the organopolysiloxane be substantially free of hydroxyl groups. In general the polysiloxane fluids should have a viscosity of between about 10,000 and 600,000 cs., and more preferably between about 50,000 and 400,000 cs., at 25°C. Optimum results have been obtained in the lower portion of these ranges such as from about 50,000 to 100,000 centistokes. In addition, it is possible to combine high and low viscosity fluids to form a fluid having the desired viscosity range.

Although the release composition of this invention may contain from about 1 to 25 percent of polysiloxane fluid, it is preferred that it contain from about 5 to about 15 percent based on the weight of the composition.

The aminofunctional silicon fluids employed in this composition may be prepared by mixing an organopolysiloxane with aminofunctional silanes or siloxanes and thereafter equilibrating the mixture in the presence of a catalyst. Organopolysiloxanes which may be used in the preparation of these aminofunctional silicon fluids are cyclic siloxanes of the general formula

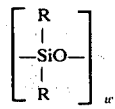

or linear or branched organopolysiloxanes having the general formula

in which R is the same as R above, $y$ is a number of from about 0.5 to 2.49, $z$ is a number of from 0.001 to 1 and the sum of $y$ and $z$ is a number of from 1 to 2.5 and $w$ is a number of from 3 to 10.

Examples of suitable cyclic organopolysiloxanes which may be used in the formation of these aminofunctional silicon fluids are hexamethylcyclotrisiloxane, hexaphenylcyclotrisiloxane, 1,2,3-trimethyl-1,2,3-triphenylcyclotrisiloxane, 1,2,3-trimethyl-1,2,3-trivinylcyclotrisiloxane, octamethylcyclotetrasiloxane, 1,2,3,4-tetramethyl-1,2,3,4-tetravinylcyclotetrasiloxane and the like. Cyclic siloxanes in which $w$ has a value of from 3 to 4 are preferred.

Examples of linear or branched chained siloxanes which may be used are triorganosiloxy end-blocked organopolysiloxanes such as trimethylsiloxy end-blocked polydimethylsiloxanes, polydiethylsiloxanes, polymethylphenylsiloxanes, polydiphenylsiloxanes and copolymers thereof.

The aminofunctional silanes or siloxanes which are reacted with the organopolysiloxanes may be represented by the general formula

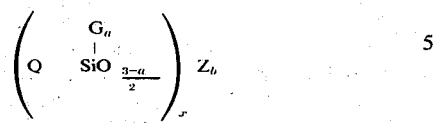

where G represents the radicals R, OR', OR'' NR'$_2$ or OSiR$_3$ in which R is the same as R above, R' represents hydrogen or monovalent hydrocarbon radicals having from 1 to 18 carbon atoms, R'' is a divalent hydrocarbon radical having from 1 to 10 carbon atoms or a divalent hydrocarbonoxy radical in which the oxygen is in the form of an ether linkage or an unsaturated divalent hydrocarbon radical, Q represents the radicals

R'$_2$NR''—,

R'$_2$NR''N R''—,

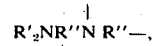

Z is a radical selected from the group consisting of R'O$_{0.5}$, R$_3$SiO$_{0.5}$, and R'$_2$NR''O$_{0.5}$, in which R, R' and R'' are the same as above, $a$ is a number of from 0 to 2, $b$ is a number of from 0 to 3, $c$ and $d$ are each numbers of from 1 to 10, and $x$ is a number of from 1 to 20,000.

Examples of suitable divalent radicals represented by R'' are hydrocarbon radicals such as ethylene, trimethylene, tetramethylene, hexamethylene, octamethylene; hydrocarbonoxy radicals having the formulae (—OC$_2$H$_4$—)$_r$, (—OC$_2$H$_4$OCH$_2$—)$_r$, (—OC$_3$H$_6$—)$_r$, in which $r$ is a number of from 1 to 50, such as ethylene oxide, trimethylene oxide and polymers thereof and alkylene radicals such as vinylene, propenylene, butenylene, hexenylene and the like.

Examples of suitable aminofunctional silanes are betaaminopropyltriethoxysilane, gamma-aminopropyltrimethoxysilane, methyl-beta-(aminoethyl)-gamma-aminopropyldimethoxysilane, omegaaminohexyltributoxysilane, beta-(aminoethoxy) propyltrimethoxysilane, beta-(aminoethoxy)-hexyltriethoxysilane, beta-(aminopropoxy) butyltributoxysilane, methyl-beta-(aminopropoxy) propyldi-(aminoethoxy) silane,

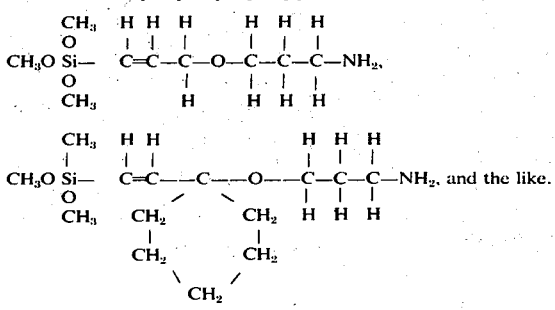

Representative examples of aminofunctional siloxanes are

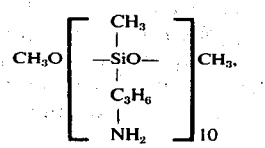

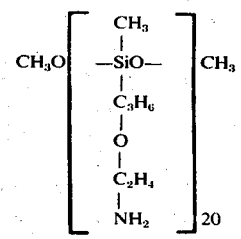

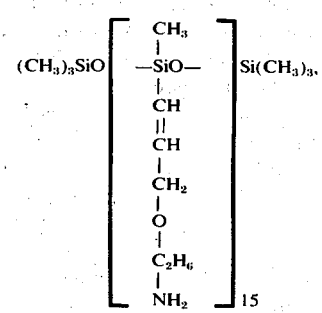

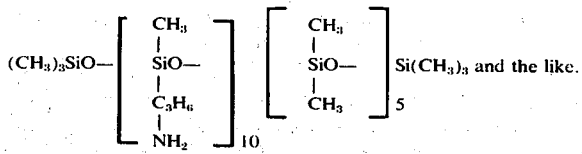

The aminofunctional silicon fluids are prepared by equilibrating a mixture containing an aminofunctional silane or siloxane and an organopolysiloxane in the presence of a base catalyst.

Catalysts which may be employed in the equilibration reaction are bases such as hydroxides, e.g., sodium hydroxide, potassium hydroxide, lithium hydroxide, cerium hydroxide, tetramethylammonium hydroxide and the like; alkali metal alkoxides, e.g., lithium methoxide, lithium butoxide, sodium butoxide and the like; alkali metal hydrides, e.g., lithium hydride, sodium hydride and the like; silanoates, e.g., lithium silanoate, potassium silanoate, tetramethylammonium silanoate and the like; alkali metal alkyls, e.g., ethyllithium, ethylsodium, butyllithium; alkali metal alkenyls, e.g., vinyllithium; alkali metal aryls, e.g., biphenyl sodium, phenyllithium, potassium naphthalene, lithium naphthalene and the like. Even though other catalysts may be used, it is preferred that alkali metal hydroxides be employed in the equilibration reaction.

Although the amount of catalyst is not critical, it is preferred that from 0.0001 percent up to about 10 percent by weight of catalyst based on the weight of the aminofunctional silane or siloxane be employed to effect equilibration.

Generally it is desirable to remove or destroy the catalysts after equilibration because their presence will adversely affect the properties of the resulting polymer. The catalysts may be removed, for example, by washing with water or they may be destroyed by neutralizing with acidic reagents. In addition, certain catalysts may be destroyed by heating the reaction mixture to an elevated temperature after the equilibration reaction is completed.

The equilibration reactions may be conducted at any temperature ranging from about 25°C. up to about 200°C. over a period of time ranging from 0.5 hour up to several days in the presence or absence of a solvent. It is preferred that the equilibration reaction be conducted in an inert atmosphere.

Generally, it is preferred that the equilibration be conducted in the absence of a solvent; however, when lithium containing catalysts are used, then it is preferred that the equilibration be conducted in the presence of "aprotic" solvents.

The term "aprotic solvent" is intended to mean any organic solvent which is free of active protons. These may include such solvents as various tertiary amines, such as triethylamine, tributylamine, pyridine and the like. Other suitable solvents are dimethyl sulfoxides, dioxane, alkyl ethers; glycols such as diethylene glycol diethyl ether, diethylene glycol dimethyl ether, diethoxyethane, tetrahydrofuran and the like. These solvents are chosen such that their electron donating centers are capable of forming a coordination complex with the cation, thereby increasing its reactivity towards the diorganocyclosiloxane. Aprotic solvents which have Lewis base characteristics are preferably employed because of their ability to donate electrons to the cation, thereby coordinating with the cation and enhancing its reactivity by virtue of such coordination.

Certain other hydrocarbon aprotic solvents which do not coordinate with the cation may be employed with the aprotic solvents described above to provide more intimate contact between the reactants. Examples of suitable hydrocarbon aprotic solvents are heptane, benzene, toluene, xylene, and the like. It is preferred that from 0.05 to about 10 percent of an aprotic solvent having a Lewis base characteristic be employed and the remainder of the solvent may be selected from the hydrocarbon aprotic solvents.

Other aminofunctional silicon fluids which may be used in this invention may be prepared by reacting (polyaminoalkyl) alkoxysilanes of the formula

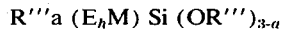

or the corresponding siloxanes with organosiloxanes of the general formula

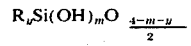

wherein R is the same as above, R''' is a monovalent hydrocarbon radical having from 1 to 18 carbon atoms, M is an aliphatic hydrocarbon radical having from 1 to 10 carbon atoms and having a valence of $h+1$, where $h$ is a number of from 1 to 3, E is a monovalent radical attached to M by a carbon-nitrogen bond and is composed of carbon, nitrogen and hydrogen atoms and contains at least two amine groups, $a$ is a number of from 0 to 2, $m$ has a positive average value up to and including 2, and $y$ is a number of from 0.5 to 2.49 and the sum of m and y has an average value up to and including 3.

These aminofunctional siloxane copolymers may be prepared by contacting the aminofunctional silanes or the corresponding siloxanes with the organosiloxane in a liquid phase in accordance with the procedure described in U.S. Pat. No. 3,355,424 to Brown. Generally the reaction will proceed rather slowly at room temperature, however, the reaction rate may be accelerated by heating the reaction mixture at temperatures of from 50° to about 200°C.

Other aminofunctional silicon fluids which may be used in this invention are tertiary aminoorganosilicon fluids (silanes and siloxanes) which have at least one ether linkage in the organo group connecting the tertiary amino group to the silicon atoms. The tertiary aminoorganosiloxanes may be represented by the general formula

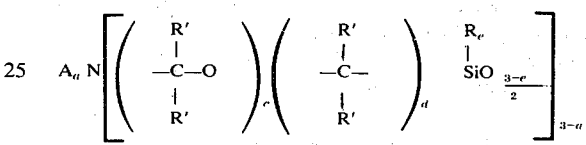

in which A is a monovalent hydrocarbon radical, a hydroxy terminated polyalkyleneoxy group, an alkenyloxy terminated polyalkyleneoxy group, a hydroxyalkyl group, a tertiary aminoalkyl group or a divalent group which, together with the nitrogen atom forms a heterocyclic ring, R is a monovalent hydrocarbon radical or a halogenated monovalent hydrocarbon radical, R' is a monovalent hydrocarbon radical having from 1 to 18 carbon atoms or hydrogen, $a$ is a number of from 0 to 2, $c$ and $d$ are each numbers of from 1 to 10 and $e$ is a number of from 0 to 2.

These tertiary aminosiloxanes may be prepared by a platinum catalyzed addition reaction of an alkenyl ether of a tertiary hydroxyalkyl amine and a hydrosilicon compound (i.e., a silane or siloxane containing silicon-bonded hydrogen) in accordance with the procedure described in U.S. Pat. No. 3,402,191 to Morehouse. Generally temperatures of from 100°C. to about 160°C. are preferred and solvents for the reactants (e.g., alcohols such as ethanol, aromatic hydrocarbons such as toluene, and ethers such as ethylene glycol dimethyl ether) can be employed, particularly where the reactants are incompatible and/or it is desired to minimize cross-linking. It is preferred that the addition reaction be conducted under an atmosphere of an inert gas to minimize side reactions.

Other aminofunctional silicon fluids which may be used are those derived from the partial hydrolysis and condensation of a liquid silanol chain-stopped polydiorganosiloxane having the formula

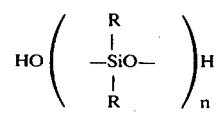

and an aminoalkoxyalkylsilane or an aminoalkoxyalkenylsilane having the formula

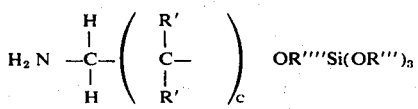

and if desired, an aminoalkylsilane having the formula

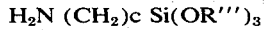

in which R, R', R''', c and n are the same as above and R'''' is a divalent alkylene radical having from 2 to 10 carbon atoms or a divalent alkenyl radical having from 3 to 8 carbon atoms and an olefinic bond on the carbon atom adjacent to the silicon atom. These aminofunctional organopolysiloxane copolymers may be prepared in accordance with the procedure described in U.S. Pat. No. 3,544,498 to Holdstock et al in which a mixture containing the silanol chain-terminated polyorganosiloxane and the aminoalkoxyalkylsilane or aminoalkyoxyalkenylsilane and if desired, the aminoalkylsilane are partially hydrolyzed and condensed by adding the necessary amount of water to provide the degree of hydrolysis and condensation desired. Generally the amount of hydrolysis and condensation desired is that amount which will result in a copolymer having the desired viscosity and the desired alkoxy content. After the partial hydrolysis and condensation, the reaction mixture consists of the organopolysiloxane copolymer, free alcohol corresponding to the alkoxy group which is hydrolyzed from the silane by the water addition and water resulting from the condensation of the silanol groups. The water and alcohol can be left in the reaction mixture or it can be readily removed therefrom by stripping at reduced pressures at temperatures ranging from room temperature up to 20° to 40°C.

Generally the amount of aminofunctional silicon fluid employed in this composition ranges from about 0.1 percent up to about 10 percent, preferably from about 1 to 5 percent and more preferably from about 1 to 2 percent.

The molecular weight of the polyglycols used in this composition may range from about 1500 to about 4000 and more preferably from about 2000 to 3000. The polyglycols can be either homopolymers of ethylene or propylene glycols or copolymers of the two. The amount of polyglycol present in this composition is not critical and may range from about 2 to 25 percent and more preferably from about 5 to 15 percent.

The fillers, especially mica should have a particle size within the range of from about 60 to 600 mesh, otherwise the mica will not function properly. The mica serves as a release agent and also provides channels through which entrapped air can escape.

The amount of mica which may be employed in this composition may range from about 20 to 70 percent, and more preferably from about 30 to 50 percent based on the weight of the release composition.

Thickening agents which are employed in this composition are those types which will thicken non-polar solvents. Examples of suitable thickening agents are bentonite clay, Cab—O—Sil and metallic salts of higher fatty acids, e.g., zinc stearate, calcium stearate, aluminum stearate and the like. The thickening efficiency of, for example, bentonite is improved by the addition of a polar solvent; such as alcohols, e.g., methanol, ethanol, ethylene glycol; or water or propylene carbonate. These solvents serve as a wetting agent for the bentonite clay and are employed in an amount of from about 0.1 to about 5.0 percent and more preferably from about 0.3 to about 1 percent by weight based on the weight of the release composition.

Any hydrocarbon solvent having a boiling point below about 200°C. may be employed in this composition. The hydrocarbon can be either cycloparaffins such as cyclohexane or aliphatic hydrocarbons such as petroleum naphtha, hexane, gasoline and the like. The amount of solvents should range from about 20 to 60 percent and preferably from about 40 to 50 percent based on the weight of the composition.

A sufficient amount of acid may be incorporated in the mold release composition of this invention to neutralize the amine groups on the aminofunctional silicon fluids. Examples of suitable acids are hydrochloric acid, sulfuric acid or organic acids such as benzenesulfonic acid, benzoic acid and the like. Generally, the acid, preferably a mineral acid, such as hydrochloric acid, is added to the composition in a ratio of about 1:1 based on the amine. As an alternative, amine salts such as amine hydrochloride salts of the aminofunctional silicon fluids may be substituted for the aminofunctional silicon fluid and acid.

The mold release composition of this invention may be prepared by mixing the ingredients in any suitable manner; however, it is preferred that the hydrocarbon solvent be added to a mixing vessel and the other ingredients added thereto in the following order. Agitation should be employed throughout the addition. The aminofunctional silicon fluid is first added to the hydrocarbon solvent followed by the addition of the acid, if desired. Mica is then added slowly followed by the addition of the thickening agent. If bentonite clay is added as the thickening agent it is preferred that methanol be added as a wetting agent. Finally the polyglycol and organopolysiloxane fluid are then added and the composition is agitated for about 15 minutes at a temperature below about 50°C.

The resulting composition is a thixotropic material which when under pressure will flow quite easily, yet it does not separate when subjected to loading operations, spraying operations pumping operations or the agitation encountered during shipment.

These mold release compositions may be used as release agents in molding rubber and plastic articles. They also exhibit excellent release properties when employed as release agents in tire manufacturing. It was found that the release compositions of this invention provide more cures per bag than a similar composition free of aminofunctional fluids.

Surprisingly, it was found that the aminofunctional silicon fluids have a stabilizing effect on the release compositions of this invention. In the absence of these fluids, the composition has a tendency to separate into layers, thus making the composition undesirable as a mold release agent.

The embodiments of this invention are further illustrated by the following examples in which all parts are by weight unless otherwise specified.

EXAMPLE 1

An aminofunctional silicon fluid is prepared by heating a mixture containing about 133.2 parts of octamethylcyclotetrasiloxane, 11.2 parts of beta-(aminoethyl)-gamma-aminopropyltrimethoxysilane, and 0.15 part of potassium hydroxide for 3 hours at 145°C. After cooling the liquid product to room temperature, 0.15 part of acetic acid is added to neutralize the catalyst. A liquid product having a viscosity of about 40 cs. at 25°C. is obtained.

EXAMPLE 2

A mold release composition is prepared by mixing the ingredients in the following order:
- 1108 parts of petroleum naphtha,
- 25 parts of an aminofunctional silicon fluid (Example 1)
- 2.3 parts of hydrochloric acid,
- 950 parts mica, 325 mesh,
- 25 parts bentonite clay (sold under the tradename Bentone 38 by National Lead Company),
- 10 parts of methanol,
- 305 parts of polyglycol-copolymer of ethylene and propylene glycol in amount of 50% of each of said copolymer having a molecular weight of 2600, and
- 208 parts of dimethylpolysiloxane fluid, (100,000 cs. at 25°C.).

The ingredients are mixed for about 15 minutes at a temperature below about 50°C. and filtered.

When this composition is applied to green tire carcasses, it exhibits excellent release properties and also substantially increases the bag life.

The above formulation may be stored for several months without any indication of separation.

EXAMPLE 3

A mold release composition is prepared by adding the following ingredients in the order specified.
- 51 parts of petroleum naphtha,
- 0.5 part of the aminofunctional silicon fluid (Example 1)
- 0.01 part of hydrochloric acid,
- 34 parts of mica, 325 mesh,
- 0.5 part bentonite clay,
- 0.2 part of methanol,
- 8.5 parts of polyglycol-copolymer of ethylene and propylene glycol in amount of 50% each of said copolymer having a molecular weight of 2600, and
- 5.1 parts of dimethyl polysiloxane fluid, (250,000 cs. at 25°C.).

The above ingredients are mixed for 15 minutes at a temperature below about 50°C. and thereafter filtered.

This formulation provided excellent release properties when used in molding of green tire carcasses.

EXAMPLE 4

A mold release composition is prepared by adding the following ingredients in the order specified:
- 60 parts of petroleum naphtha,
- 8 parts of aminofunctional silicon fluid (Example 1)
- 50 parts of mica, 400 mesh,
- 8 parts of bentonite clay,
- 3 parts of methanol,
- 35 parts of polyglycol, copolymer of ethylene and propylene glycol in amount of 50% each of said copolymer having a molecular weight of 3,000, and
- 40 parts of dimethyl polysiloxane fluid, (300,000 cs. at 25°C.).

The above ingredients are mixed for about 15 minutes at a temperature below of about 50°C. and thereafter filtered.

Excellent release properties are observed when this formulation is used in molding green tire carcasses.

EXAMPLE 5

A mold release composition is prepared in accordance with the procedure of Example 2, except that the aminofunctional silicon fluid is prepared by heating 129 parts of a hydrosiloxane having the average formula $(CH_3)_3 SiO[(CH_3)_2 SiO)]_{8.5} [(CH_3HSiO)]_{3.5} Si(CH_3)_3$ with 25 parts of platinum per million parts by weight of the reactants as chloroplatinic acid. About 71 parts of the allyl ether of N, N-dimethylethanolamine having the formula $(CH_3)_2 NCH_2 CH_2 OCH_2 CH=CH_2$ is added dropwise while maintaining the reaction mixture at a temperature between about 150° and 158°C. The total time of addition is about 8 minutes. The reaction mixture is heated at 150°C. for an additional 3 hours, then sparged at this temperature for 40 minutes with nitrogen. The resulting product is amber in color and has a viscosity of about 90 cs. at 25°C.

When the aminofunctional silicon fluid prepared above is substituted for the aminofunctional silicon fluid in the formulation of Example 2, excellent release properties are obtained when this formulation is used in molding green tire carcasses.

EXAMPLE 6

A mold release composition is prepared in accordance with Example 2, except that the aminofunctional silicon fluid is prepared by mixing 30 parts of a silanol chain-stopped polydimethylsiloxane of the formula $$HO \left[ \begin{array}{c} CH_3 \\ -SiO- \\ CH_3 \end{array} \right]_5 H$$

with 7.5 parts of 3-(3-aminopropoxy)propyltrimethoxysilane and about 12 parts of gamma-aminopropyltrimethoxysilane. The reaction mixture is thoroughly agitated and then 0.35 part of water is added with agitation. The resulting organopolysiloxane copolymer has a viscosity of about 150 cs. at 25°C.

When the aminofunctional silicon fluid prepared above is substituted for the aminofunctional silicon fluid in the formulation of Example 2, excellent release properties are obtained when used in molding green tire carcasses.

EXAMPLE 7

A mold release composition is prepared in accordance with the procedure described in Example 1, except that the aminofunctional silicon fluid is prepared by heating a mixture containing about 150 parts of a (polyaminoalkyl) alkoxysilane having the formula $(CH_3O)_3 Si(CH_2)_3 NHCH_2 CH_2 NH_2$ with about 50 parts of a polymer having the formula $HO(CH_3)_2 SiO[(CH_3)_2 SiO]_a Si(CH_3)_2 OH$ where the average value of a is such that the polymer contains about 3.5% OH groups to a temperature of about 150°C. under reflex conditions cooled and then about 17.2 parts of water and about 150 parts of ethanol are added. About one third of the ethanol is removed by distillation. About 75 weight percent of the units of the resulting copolymer have the formula

units and about 25 weight percent of the units are (CH$_3$)$_2$ SiO. Theoretically the value of z is in the range of between 0 and 1.

Although specific examples of the invention have been described herein, it is not intended to limit the invention solely thereto, but to include all the variations and modifications falling within the spirit and scope of the appended claims.

What is claimed is:

1. A release composition comprising:
   A. from 1 to 25 percent by weight based on the weight of the composition of any organopolysiloxane fluid having an average viscosity of from 1,000 to 600,000 cs. at 25°C. in which the organic groups are selected from the class consisting of monovalent hydrocarbon radicals having from 1 to 18 carbon atoms and halogenated monovalent hydrocarbon radicals,
   B. from 0.1 to 10 percent by weight based on the weight of the composition of an aminofunctional silicon fluid,
   C. from 20 to 70 percent by weight based on the weight of the composition of mica having a particle size of from 60 to 600 mesh,
   D. from 0.1 to 5.0 percent by weight based on the weight of the composition of a thickening agent for nonpolar solvents,
   E. from 2 to 25 percent by weight based on the weight of the composition of a polyglycol having a molecular weight of from about 1500 to 4000 in which the polyglycol is selected from the class consisting of homopolymers of ethylene glycol and propylene glycol and copolymers of ethylene and propylene glycol,
   F. from 20 to 60 percent by weight based on the weight of the composition of a hydrocarbon solvent having a boiling point below 200°C. at 760 mm Hg., in which the aminofunctional silicon fluid is obtained from the equilibration of an organopolysiloxane selected from the class consisting of cyclic siloxanes of the formula

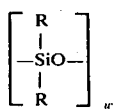

and siloxanes of the formula

and an aminofunctional silane or siloxane in the presence of a base catalyst, said aminofunctional silane or siloxane is represented by the formula

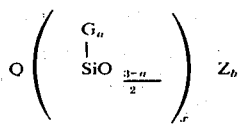

in which G is selected from the group consisting of R, OR', OSiR$_3$ and OR'' NR'$_2$ in which R is selected from the group consisting of monovalent hydrocarbon radicals having from 1 to 18 carbon atoms and halogenated monovalent hydrocarbon radicals, R' is selected from the group consisting of hydrogen and monovalent hydrocarbon radicals having from 1 to 18 carbon atoms, R'' is selected from the group consisting of divalent hydrocarbon radicals, having up to 8 carbon atoms, divalent hydrocarbonoxy radicals selected from the class consisting of (—OC$_2$H$_4$—)$_r$, (OC$_2$H$_4$OCH$_2$—)$_r$ and (OC$_3$H$_6$—)$_r$ and unsaturated divalent hydrocarbon radicals having from 3 to 10 carbon atoms, Q is selected from the group consisting of R'$_2$NR''—,

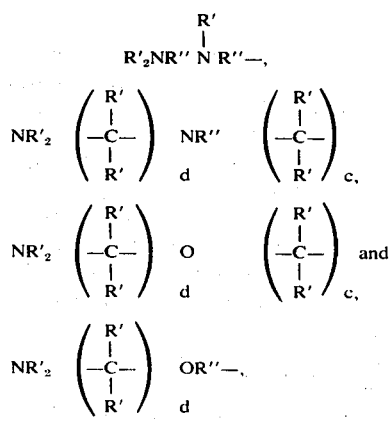

Z is selected from the class consisting of R'O$_{0.5}$, R$_3$SiO$_{0.5}$ and R'NR'' O$_{0.5}$, R, R' and R'' are the same as above, a is a number of from 0 to 2, b is a number of from 0 to 3, c and d are each numbers of from 1 to 10, r is a number of from 1 to 50, w is a number of from 3 to 10, x is a number of from 1 to 20,000, y is a number of from about 0.5 to 2.49, z is a number of from 0.001 to 1 and the sum of y and z is a number of from 1 to 2.5.

2. The composition of claim 1 which contains sufficient acid to neutralize the amino groups in the aminofunctional silicon fluid.

3. The composition of claim 1 wherein the organopolysiloxane used in the preparation of the aminofunctional silicon fluid is a cyclic organopolysiloxane of the formula

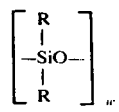

in which R is selected from the group consisting of monovalent hydrocarbon radicals having from 1 to 18 carbon atoms and halogenated monovalent hydrocarbon radicals and w is a number of from 3 to 10.

4. The composition of claim 1 wherein the organopolysiloxane used in the preparation of the aminofunctional silicon fluid is represented by the formula

in which R is selected from the group consisting of monovalent hydrocarbon radicals having from 1 to 18 carbon atoms and halogenated monovalent hydrocarbon radicals, y is a number of from about 0.5 to 2.49, $z$ is a number of from 0.001 to 1 and the sum of $y$ and $z$ is a number of from 1 to 2.5.

5. The composition of claim 1 wherein the organopolysiloxane fluid is a dimethylpolysiloxane having a viscosity between 50,000 and 400,000 cs. at 25°C.

6. The composition of claim 1 wherein the polyglycol is a copolymer of ethylene and propylene glycol in an amount of 50 percent of each, said copolymer having a molecular weight of about 2600.

7. The composition of claim 2 wherein an ammonium salt of the aminofunctional silicon fluid is substituted for the aminofunctional silicon fluid and the acid.

8. The composition of claim 1 wherein the thickening agent is bentonite and also contains from 0.1 to 5.0 percent by weight based on the weight of the composition of a wetting agent for the bentonite clay which is selected from the group consisting of polar solvents, water and propylene carbonate.

9. The composition comprising:
   A. from 1 to 25 percent by weight based on the weight of the composition of an organopolysiloxane fluid having a viscosity of from 1,000 to 600,000 cs. at 25°C., in which the organo groups are selected from the class consisting of monovalent hydrocarbon radicals having from 1 to 18 carbon atoms, and halogenated hydrocarbon radicals,
   B. from 0.1 to 10 percent by weight based on the weight of the composition of an aminofunctional silicon fluid,
   C. from 20 to 70 percent by weight based on the weight of the composition of mica having a particle size of from 60 to 600 mesh,
   D. from 0.1 to 5.0 percent by weight based on the weight of the composition of a thickening agent for nonpolar solvents,
   E. from 2 to 25 percent by weight based on the weight of the composition of a polyglycol having a molecular weight of from about 1500 to 4000 in which the polyglycol is selected from the class consisting of homopolymers of ethylene glycol and propylene glycol and copolymers of ethylene and propylene glycol,
   F. from 20 to 60 percent by weight based on the weight of the composition of a hydrocarbon solvent having a boiling point below 200°C. at 760 mm Hg., in which the aminofunctional silicon fluid is obtained from the reaction of (polyaminoalkyl) alkoxysilanes of the formula

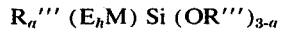

or siloxanes thereof with organopolysilxoanes of the formula

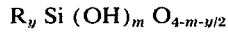

in which R is selected from the group consisting of monovalent hydrocarbon radicals having from 1 to 18 carbon atoms and halogenated monovalent hydrocarbon radicals, $R'''$ is a monovalent hydrocarbon radical having from 1 to 18 carbon atoms, M is an aliphatic hydrocarbon radical having from 1 to 10 carbon atoms and having a valence of $h+1$, $h$ is a number of from 1 to 3, E is a monovalent radical attached to M by a carbon-nitrogen bond and is composed of carbon, nitrogen and hydrogen atoms and contains at least two amine groups, $a$ is a number of from 0 to 2, $m$ has a positive average value up to and including 2 and $y$ is a number of from 0.5 to 2.49 and the sum of $m$ and $y$ is an average value up to and including 3.

10. The composition of claim 9 wherein the aminofunctional silicon fluid is obtained from the hydrolysis and condensation of a liquid polydiorganopolysiloxane having the formula

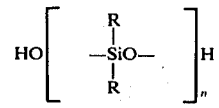

and a silane selected from the group consisting of an aminoalkoxyalkylsilane and an aminoalkoxyalkenylsilane of the formula

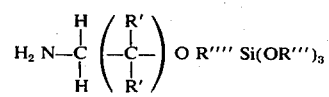

in which R is selected from the group consisting of monovalent hydrocarbon radicals having from 1 to 18 carbon atoms and halogenated monovalent hydrocarbon radicals, $R'$ is selected from the group consisting of hydrogen and monovalent hydrocarbon radicals having from 1 to 18 carbon atoms, $R''''$ is selected from the group consisting of divalent alkylene radicals having from 2 to 10 carbon atoms and divalent alkenyl radicals having from 3 to 10 carbon atoms and an olefinic bond on the carbon atoms adjacent to the silicon atom, $c$ is a number of from 1 to 10 and $n$ is a number greater than 20.

11. The composition of claim 10 which includes an aminoalkylsilane of the formula $$H_2N\ (CH_2)_c\ Si\ (OR''')_3$$

in which $R'''$ is a monovalent hydrocarbon radical having from 1 to 18 carbon atoms and $c$ is a number of from 1 to 10.

12. The composition of claim 9 wherein the aminofunctional silicon fluid is a tertiary aminoorganosiloxane of the general formula

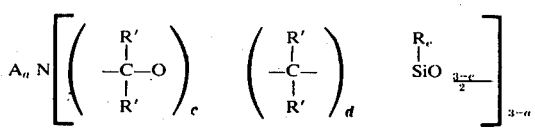

in which A is selected from the group consisting of monovalent hydrocarbon radicals having from 1 to 18 carbon atoms, hydroxy terminated polyalkylenenoxy groups, alkenyloxy terminated polyalkleneoxy groups, hydroxyalkyl groups, tertiary aminoalkyl groups and divalent groups in which together with the nitrogen atom forms a heterocyclic ring containing only carbon and nitrogen, with hydrogen as the only substituent on the ring or only carbon, nitrogen and oxygen with hydrogen as the only substituent on the ring, R is selected from the group consisting of monovalent hydrocarbon radicals having from 1 to 18 carbon atoms and halogenated monovalent hydrocarbon radicals, $R'$ is selected from the group consisting of hydrogen and monovalent hydrocarbon radicals having from 1 to 18 carbon atoms, $a$ is a number of from 0 to 2, $c$ and $d$ are each numbers of from 1 to 10 and $e$ is a number of from 0 to 2, said tertiary aminoorganosiloxane is obtained from the platinum catalyzed addition reaction of an alkenyl ether of a tertiary hydroxyalkylamine and a silicon compound selected from the group consisting of silanes and siloxanes containing silicon bonded hydrogen.

* * * * *